United States Patent
Cruz-Hernandez et al.

(10) Patent No.: US 9,727,141 B2
(45) Date of Patent: *Aug. 8, 2017

(54) PRODUCTS AND PROCESSES FOR PROVIDING FORCE SENSATIONS IN A USER INTERFACE

(71) Applicant: Immersion Corporation, San Jose, CA (US)

(72) Inventors: Juan Manuel Cruz-Hernandez, Montreal (CA); Danny Grant, Montreal (CA); Pedro Gregorio, Verdun (CA); Neil T. Olien, Montreal (CA); Adam C. Braun, Portland, OR (US)

(73) Assignee: Immersion Corporation, San Jose, CA (US)

(*) Notice: Subject to any disclaimer, the term of this patent is extended or adjusted under 35 U.S.C. 154(b) by 205 days.

This patent is subject to a terminal disclaimer.

(21) Appl. No.: 14/572,529

(22) Filed: Dec. 16, 2014

(65) Prior Publication Data

US 2015/0106707 A1   Apr. 16, 2015

Related U.S. Application Data

(63) Continuation of application No. 10/686,323, filed on Oct. 15, 2003, now Pat. No. 8,917,234.

(60) Provisional application No. 60/419,024, filed on Oct. 15, 2002.

(51) Int. Cl.
| | |
|---|---|
| G06F 3/041 | (2006.01) |
| G06F 3/01 | (2006.01) |
| G06F 3/023 | (2006.01) |
| G06F 3/0482 | (2013.01) |
| G06F 3/0484 | (2013.01) |

(52) U.S. Cl.
CPC ............ G06F 3/016 (2013.01); G06F 3/0233 (2013.01); G06F 3/0482 (2013.01); G06F 3/04842 (2013.01)

(58) Field of Classification Search
CPC ........ G06F 3/011; G06F 3/016; G06F 3/0488; G06F 3/0484
USPC ......................... 345/156, 161, 419, 420, 702
See application file for complete search history.

(56) References Cited

U.S. PATENT DOCUMENTS 8,917,234 B2 * 12/2014 Cruz-Hernandez ..... G06F 3/016
                                                                   345/156

* cited by examiner

*Primary Examiner* — Calvin C Ma
(74) *Attorney, Agent, or Firm* — Kilpatrick Townsend & Stockton LLP (57) ABSTRACT

Products and processes for providing haptic feedback in a user interface device are disclosed. In one exemplary embodiment, a process comprises defining a first cell, mapping a first location of a matrix with the defined first cell, and mapping a second location of the matrix with the defined first cell. The first cell comprises a first parameter representing a first haptic effect.

27 Claims, 12 Drawing Sheets

PRODUCTS AND PROCESSES FOR PROVIDING FORCE SENSATIONS IN A USER INTERFACE

CROSS-REFERENCE TO RELATED APPLICATIONS

This application is a continuation of U.S. patent application Ser. No. 10/686,323, filed Oct. 15, 2003, entitled "Products and Processes for Providing Force Sensations in a User Interface," which claims priority to U.S. Provisional Application No. 60/419,024, filed Oct. 15, 2002, entitled "Methods for Providing Force Sensations in a User Interface," the priority benefit of which is claimed by this application, and both of which are incorporated herein by reference in their entirety.

FIELD

The invention generally relates to products and processes for providing haptic feedback.

BACKGROUND

Tactile cues and feedback enhance the human-machine interface. Providing tactile feedback increases the amount of information available to a user in the operation of a device. Some devices utilize structural tactile methods. One such example is to provide a raised surface on an input surface, e.g., keypad, of the device. Such methods, however, are inherently static, and thus, cannot offer a wide array of, or effective, tactile feedback. Whereas before, one had to rely solely on aural, visual cues, and/or structural tactile cues, active methods of tactile feedback, i.e., haptics, increasingly provide greater and more effective physical cues to users of various devices.

Enhancing the functionality of a device with haptics, however, generally requires additional processor memory and speed. Moreover, enhancing a device with haptics may further complicate design considerations by placing demands on space constraints, especially where manufacturers of such devices, to satisfy consumer demands, strive to reduce the physical size of devices while increasing device functionality.

In a one-dimensional environment, one may select an item from a set of items, e.g., a list of names, by using a "detent" effect, where each item in the item set can be rendered or mapped to a single detent in a one-dimensional device. In a two-dimensional environment, one may select an item in horizontal or vertical directions. Therefore, one may speak of two-dimensional detents, also referred to as matrix-detents.

To create a haptic effect with a single effect located at different locations on a workspace, or interface area (such as for example, a keypad), it is known to create all those haptic effects in the device, and play them each cycle. A shortcoming of this known approach is that to create a two-dimensional detent, more than one effect has to be created. This, in turn, demands more on the communications bandwidth, as well as more memory and computational time on an embedded system, i.e., a system disposed on or within a device or system. Some applications are not well-suited for communicating an amount of traffic demanded by the known approach.

SUMMARY

The invention provides products and processes for providing haptic feedback in a user interface device. In one exemplary embodiment, a single effect can be repeated at several locations in a matrix. One process according to the present invention comprises defining a first cell comprising a first parameter representing a first haptic effect, mapping a first location of a matrix with the defined first cell, and mapping a second location of the matrix with the defined first cell.

In another embodiment, a process comprises providing a cell comprising an arc and first and second edges. The cell forms a wedge of a switch. The process also comprises providing a plurality of force vectors within the cell and delimiting a corner of the wedge. The force vectors are directed radially toward the first and second edges. The corner is formed by the first and second edges.

In another exemplary embodiment, an apparatus comprises a first primary channel disposed about a first axis, a second primary channel disposed about a second axis, a first secondary channel disposed proximate to the first primary channel, and a second secondary channel disposed proximate to the second primary channel.

These exemplary embodiments are mentioned not to limit the invention, but to provide an example of an embodiment of the invention to aid understanding. Exemplary embodiments are discussed in the Detailed Description, and further description of the invention is provided there. Advantages offered by the various embodiments of the present invention may be understood by examining this specification.

BRIEF DESCRIPTION OF THE DRAWINGS

The accompanying drawings, which constitute part of this specification, help to illustrate embodiments of the invention. In the drawings, like numerals are used to indicate like elements throughout.

DETAILED DESCRIPTION

Embodiments of the present invention include products and processes for providing haptic feedback in a user interface device. In some interface devices, cutaneous feedback (such as, without limitation, vibration, texture, and heat), is also provided to the user, in addition to kinesthetic feedback (such as, without limitation, forces or resistances sensed by muscles, tendons, and/or joints) both subsumed under the phrase, and more generally known collectively as, "haptic feedback." The present invention may be embodied in hand-held devices, such as mobile phones, personal digital assistants ("PDAs"), camcorders, and other devices, such as control knobs and computer mice and joysticks.

Figure 1:
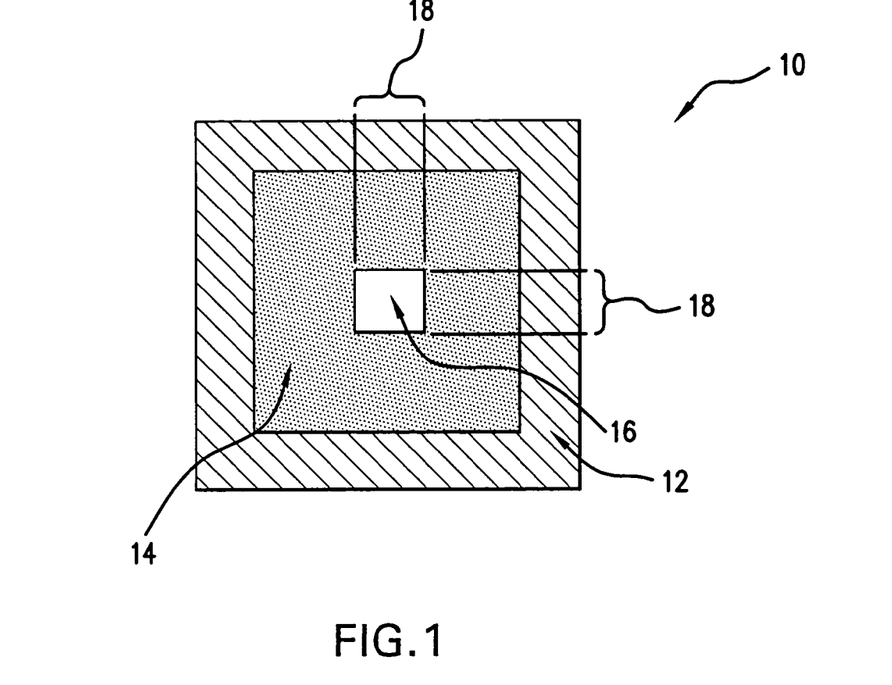
FIG. 1 is a schematic drawing of a cell according to an embodiment of the present invention.

Referring now to FIG. 1, a two-dimensional cell 10 is shown. As used herein, a cell refers to a memory construct in which parameters represent or define haptic effects. In one embodiment, the cell 10 comprises a plurality of parameters, including a wall 12, a detent 14, a location 16, and a dead-band 18. Preferably, the wall 12 forms a perimeter around the cell 10. Typically, the wall 12 is a high-force constraining or defining a physical boundary of the cell 10.

In one embodiment, the detent 14 is a haptic effect, including, but not limited to, a kinesthetic force profile directing a user toward the location 16. Alternatively, the force profile of the detent 14 directs a user away from the location 16. Various haptic effects can be used for the force profiles of the detent 14. Examples of various haptic effects are described in U.S. Pat. Nos. 6,169,540 and 6,285,351, assigned to the assignee of the present invention and incorporated in their entirety herein by reference.

In general, the location 16 represents a physical area of the cell 10 where a haptic effect is disposed. In one embodiment, the dead-band 18 comprises a physical area of the cell 10 in which no forces are present. The dead-band 18 represents a stable position in the cell 10. As shown in FIG. 1, the dead-band 18 includes a horizontal component as well as a vertical component. Alternatively, other suitable parameters for and arrangements of the cell 10 can be used.

Figure 2:
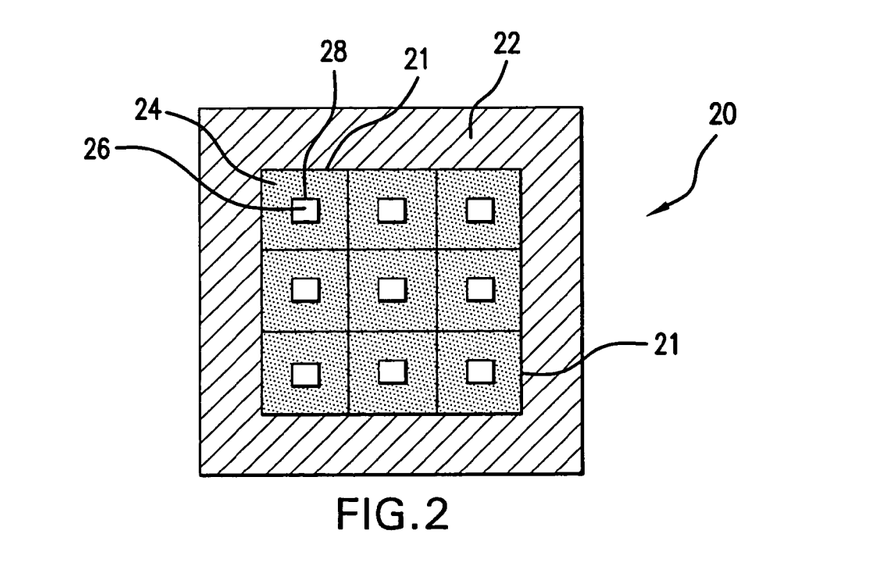
FIG. 2 is a schematic drawing of a matrix of the cell of FIG. 1.

Referring now to FIG. 2, a matrix 20 of cells 21 is shown. Preferably, the matrix 20 is a two-dimensional configuration of the cell 10 described above. The size of the matrix 20 is defined by the number of rows and columns. Although a three-by-three ("3×3") matrix is shown, other suitable arrangements can be used. Preferably, a repeated single haptic effect is repeated at multiple locations arranged in the matrix 20. Alternatively, different cells having different haptic effects can be arranged in the matrix 20, including an arrangement of active and inactive cells. Other suitable cells and arrangements of cells can be used.

Preferably, the matrix 20 comprises cells similar to that described above with reference to the cell 10. That is, the cells 21 each comprise parameters including a detent 24, a location 26, and a dead-band 28. However, unlike the cell 10, each of the cells 21 do not have a wall. Rather, a wall 22 defines a perimeter of the matrix 20, rather than defining each cell 21. Alternatively, other suitable cells, arrangements of cells, and cell parameters can be used.

Figure 3:
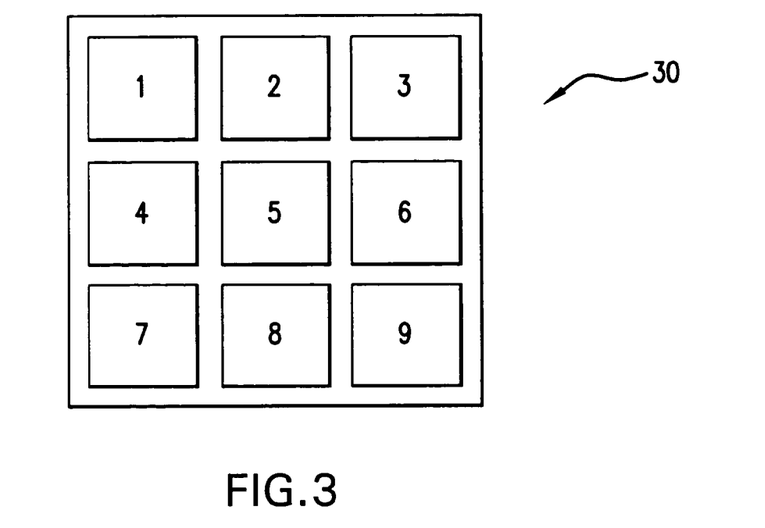
FIG. 3 is a schematic drawing of a device employing the principles of the invention.

Referring now to FIG. 3, a keypad 30 of an interface device (not shown) employing the principles of the invention is shown. In one embodiment, the keypad 30 can be disposed in a mobile telephone. In another embodiment, the keypad 30 can be disposed in a PDA. Alternatively, the keypad 30 can be used in other suitable embodiments, including in a graphical user interface ("GUI").

The numerals of the keypad 30 correspond substantially to location 26 of the matrix 20 shown in FIG. 2. Thus, a cursor in a GUI or a finger (or other digit) of or a stylus used by a user is guided by the different parameters, i.e., the wall 22, detent 24, and dead-band 28, to the center, i.e., location 26, of each cell of the device. Alternatively, the parameters can be used to guide one away from a specific point or area (not shown) on a device.

Figure 4:
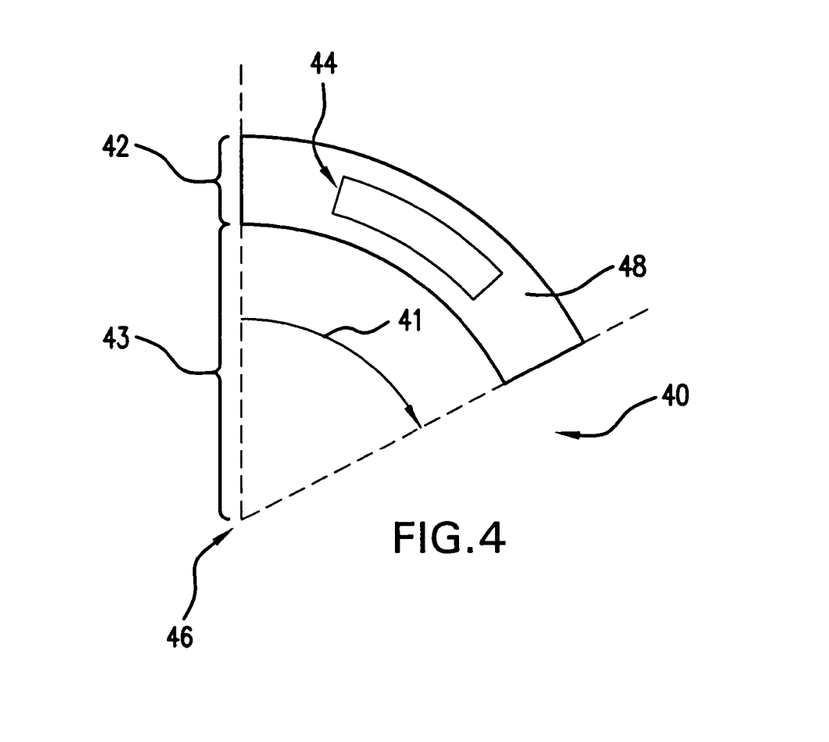
FIG. 4 is a schematic drawing of a cell according to another embodiment of the invention.

Referring now to FIG. 4, a cell 40 according to another embodiment of the invention is shown. The cell 40 is preferably defined by a radius and an arc, depending on the configuration of a particular device. A width 41 (measured in degrees) of the cell 40 is measured as an angle. A detent 48 is defined by a height and the width 41. An angular dead-band 44 is disposed within the area defining detent 48. A matrix dead-band 43 is disposed between a location 46 and the height 42.

The parameters of the cell 40 are similar to that described above with reference to the cell 10. Thus, the location 46 comprises a haptic effect, the detent 48 comprises a force profile, and the matrix and angular dead-bands 43, 44 lack any discernable force profile.

Figure 5:
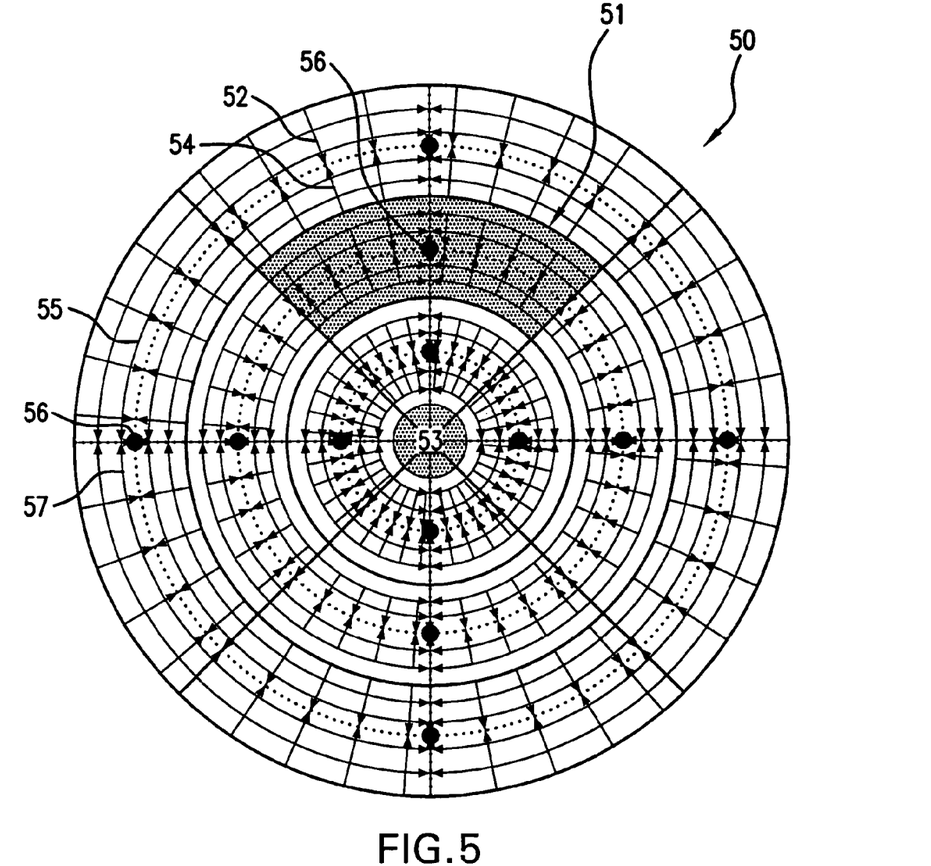
FIG. 5 is a schematic drawing of a matrix of the cell of FIG. 4.

Referring now to FIG. 5, a matrix 50 of cells 51 is shown. The matrix 50 is a two-dimensional configuration of the cell 40 described above. The matrix 50 is a 3×4 circular matrix, which is defined as including three rings along the radius of the circle and four quadrants of the circle. Alternatively, other suitable numbers of rings can be used. Also alternatively, rather than dividing the circle into four equally-sized quadrants, the circle can be divided into any other suitable number of wedges (i.e., portions of the circle defined by the radius and an arc).

Each cell 51 comprises a matrix dead-band 53, a first radial force 52, a second radial force 54, a first tangential force 55, a second tangential force 57, and a stable location 56. A wall (not shown) can be disposed surrounding the cell 51. Alternatively, other suitable cells, arrangements of cells, and cell parameters can be used. The matrix 50 can be used in suitable interface devices (not shown), such as a mobile phone, PDA, or GUI.

The first and second radial forces 52,54 are disposed radially within each cell 51. The first and second radial forces 52,54 are equal and opposite to one another. The intersection of the first and second radial forces 52,54 create a stable position along a radius.

The first and second tangential forces 55, 57 are disposed tangentially within each cell 51. The first and second tangential forces 55, 57 are equal and opposite to one another. The intersection of the first and second tangential forces 55, 57 create a stable position along an arc. The intersection of the first and second radial forces 52, 54 and the first and second tangential forces 55, 57 creates a stable location 56. There is no force profile at stable location 56. The combination of first and second radial forces 52, 54, first and second tangential forces 55, 57, and matrix dead-band 53 can be used to guide a user toward a particular location of the matrix 50, and thus, the device Referring now to FIG. 6, a schematic drawing of a system 60 implementing an embodiment of the invention is shown. The system 60 comprises a host 61, a communications channel 64, and a device 65. The host 61 comprises a host (or first) processor 62 and an effect library 63. The host 61 is located in a suitable location according to the needs of the device 65. Preferably, the host 61 is located remotely from the device 65. The host 61 is in communication with the device 65 through the communication channel 64. The communication channel 64 connects the host 61 and the device 65 through direct, indirect, wireless, or other suitable means.

Figure 6:
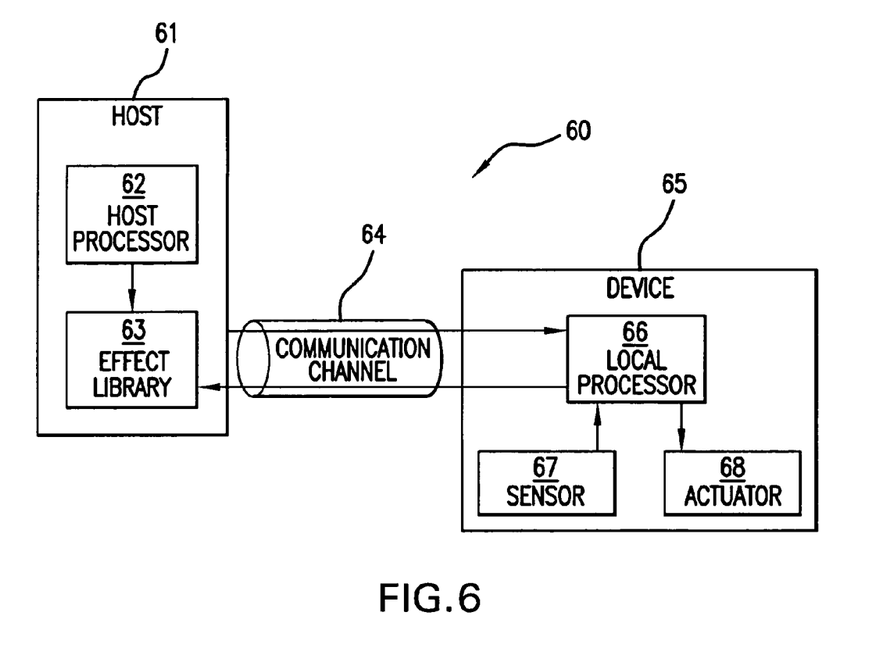
FIG. 6 is a schematic drawing of a system according to an embodiment of the invention.

The host processor 62 can be a computer or any other suitable processor, such as for example, digital logic processors capable of processing input, executing algorithms, and generating output as needed. Such processors can include a microprocessor, an Application Specific Integrated Circuit (ASIC), and state machines. Such processors include, or can be in communication with media, for example computer readable media, which stores instructions that, when executed by the processor, cause the processor to perform the steps described herein as carried out, or assisted, by a processor.

One embodiment of a suitable computer-readable medium includes an electronic optical, magnetic, or other storage or transmission device capable of providing a processor, such as the processor in a web server, with computer-readable instructions. Other examples of suitable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, including a router, private or public network, or other transmission device or channel.

The host controller 62 is in communication with the effect library 63. The effect library 63 stores instructions for a variety of haptic effects. Preferably, the host controller 62 controls the effect library 63. In one embodiment, the host controller 62 communicates instructions to the effect library 63 to communicate a particular haptic effect to the device 65. As described above, the instructions for a particular haptic effect are communicated from the host 61 to the device 65 through the communications channel 64.

The device 65 comprises a local (or second) processor 66, a sensor 67, and an actuator 68. Preferably, the local processor 66 is embedded in (i.e., disposed within) the device 65. Alternatively, the local processor 66 is located in any other suitable location. The local processor 66 is operable to receive and executions received from the host processor 62. Generally, the local processor 66 is also operable to execute instructions autonomously of the host processor 62. Where the local processor 66 is embedded in the device 65, the local processor 66 generally is more limited in size, and thus computational power, than the host processor 62. Notwithstanding the limitations in size and computational power, the local processor 66 is preferably similar to that described above with reference to the host processor 62.

The local processor 66 is in communication with a sensor 67. The sensor 67 can be a single sensor or a plurality of sensors. The sensor 67 is operable to detect a wide variety of conditions, such as, but not limited to, position, pressure, motion, direction, displacement, and changes or deviations in such conditions. The information detected by the sensor 67 is communicated to the local processor 66, which then processes this information and/or communicates the information received from the sensor 67 to the host controller 62 via the communication channel 64.

The local processor 66 is also in communication with an actuator 68. The actuator 68 can be a single actuator or a plurality of actuators. The actuator 68 is operable to receive instructions (i.e., an actuation signal) from the local processor 66 and to output haptic feedback to the device 65. The local processor 66 can vary at least one of frequency, waveform, and magnitude of the actuation signal.

Suitable structures that can provide haptic feedback and that can produce a plurality of distinct haptic sensations, include, but are not limited to, a voice coil and a permanent magnet, rotating masses, a piezo material, such as quartz, Rochelle Salt, and synthetic polycrystalline ceramics, piezoelectric ceramics, piezoelectric films, and electroactive polymers. Alternatively, other suitable actuators can be used.

While system 60 is shown with first and second processors 62,66, an alternate embodiment comprises a single processor (not shown). For example, a stand-alone device can perform the tasks of both first and second processors 62,66. Thus, in this alternate embodiment, the communication channel 64 would be implemented in software rather than hardware as described in the embodiment above with reference to FIG. 6.

Figure 7:
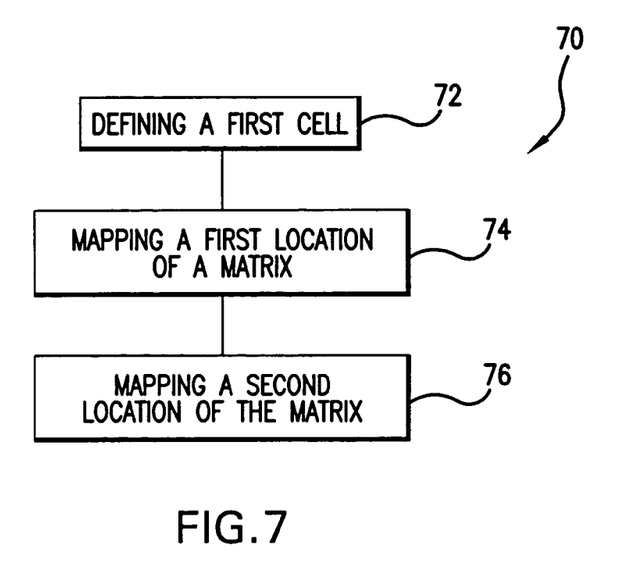
FIG. 7 is a block diagram of a method according to an embodiment of the invention.

Referring now to FIG. 7, a block diagram of a method 70 according to an embodiment of the invention is shown. FIG. 7 shows an embodiment of a method that may be used to generate a matrix of cells, as described above. However, the method 70 may be used to form alternate matrices or cells. Items shown above in FIGS. 1-6, as well as the accompanying description above, are referred to in describing FIG. 7 to aid understanding of the embodiment of the method 70 shown. Thus, the method 70 is not limited to the embodiments described above and with reference to FIGS. 1-6.

As indicated by block 72, the method 70 comprises defining a first cell. In one embodiment, the first cell is defined by the first processor. The first cell comprises first parameter representing a first haptic effect. As described above, various haptic effects can be used. In one embodiment, the first cell comprises a first detent.

In one embodiment, the method 70 comprises communicating the defined first cell from a first processor to a second processor. In another embodiment, the defined first cell is communicated from the first processor to the second processor via a communication channel. In one embodiment, the communication channel is a wireless interface.

As described above, the first processor can be a host processor and the second processor can be a local processor embedded in a device. In one embodiment, the second processor is disposed remotely from the first processor.

As indicated by block 74, the method 70 comprises mapping a first location of a matrix with the defined first cell. In one embodiment, the second processor maps the first location with the defined first cell. In one embodiment, the matrix comprises a square shape, such as, for example, the 3×3 matrix described above and with reference to FIG. 2. In another embodiment, the matrix comprises a circular shape, such as, for example, the 3×4 circular matrix described above and with reference to FIG. 5. Alternatively, other suitable configurations, shapes, and sizes of matrix can be used.

As indicated by block 76, the method 70 comprises mapping a second location of the matrix with the defined first cell. In one embodiment, the second processor maps the second location with the defined first cell. In another embodiment, the method 70 further comprises defining a second cell. Preferably, the second cell is defined by the first processor. The second cell comprises a second haptic effect. Preferably, the second haptic effect is different than the first haptic effect. Alternatively, the first and second haptic effects can be the same. In one embodiment, the second cell comprises a second detent.

In another embodiment, the method 70 further comprises communicating the defined second cell from the first processor to the second processor. In one embodiment, the defined second cell is communicated from the first processor to the second processor via the communication channel. In one embodiment, the method 70 further comprises mapping a third location of the matrix with the defined second cell by the second processor. In another embodiment, the second cell is an inactive cell, whereas the first cell is an active cell.

In one embodiment, the third location is disposed between the first and second locations. Alternatively, the first and second cells can be disposed in other desired arrangements or configurations. The second processor is operable to arrange the first and second cells in suitable arrangements without instructions from the first processor, thus reducing the amount of communication between the first and second processors, and therefore bandwidth of the communication channel. Thus, multiple effects can be displayed in a two-dimensional device by specifying a limited number of parameters and a desired number of cells in the matrix.

In another embodiment, the method 70 further comprises providing an actuator in communication with the first, second and third locations. The actuator can be similar to that described above. In one embodiment, the actuator comprises a plurality of actuators. Preferably, the actuator is operated to provide a computer-modulated force to the first, second, and third locations. The actuator preferably receives an actuating signal from the second processor. Alternatively, the actuator receives instructions from the first processor.

Figure 8:
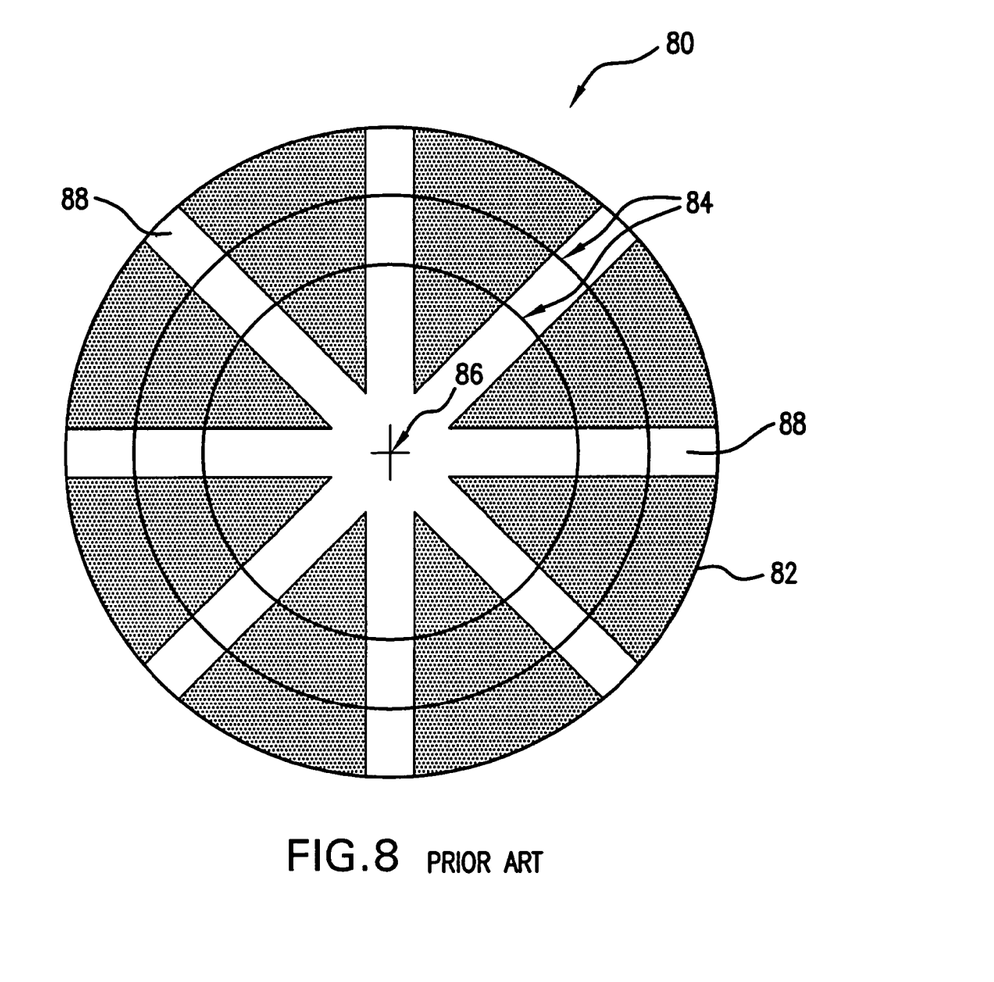
FIG. 8 is a schematic drawing of a prior art switch.
Figure 9:
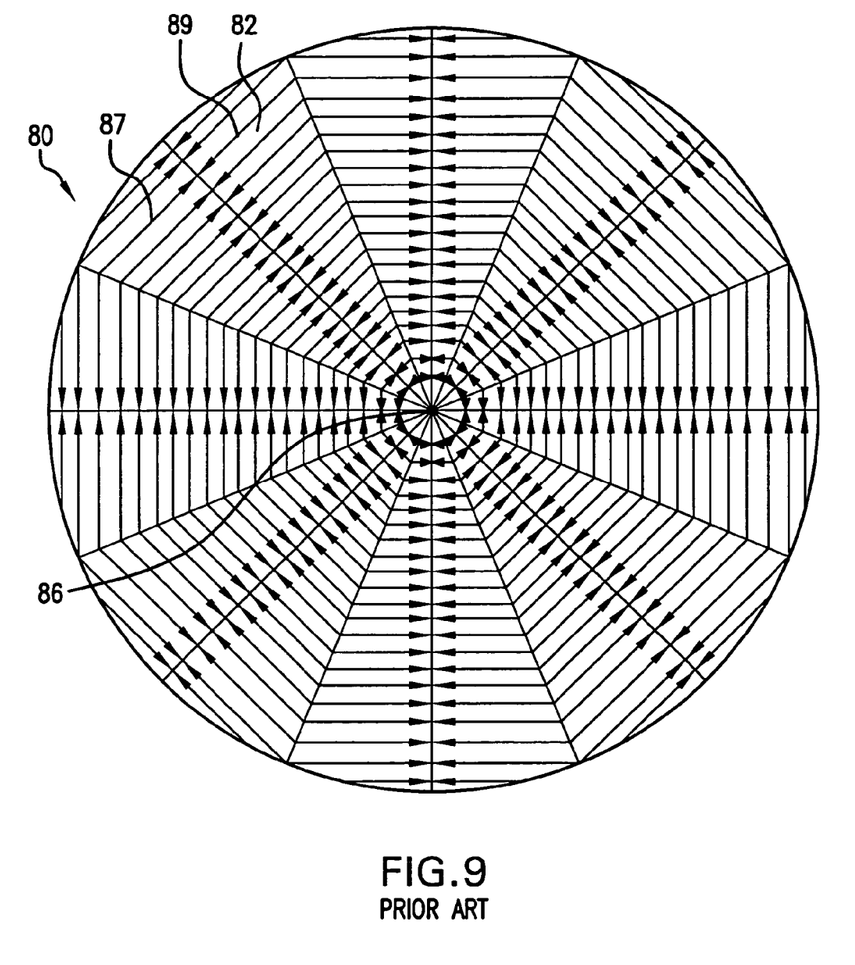
FIG. 9 is another schematic drawing of the prior art switch of FIG. 8.

Referring now to FIGS. 8 and 9, a prior art switch 80 is shown. The prior art switch 80 includes a wall 82, which forms a perimeter around the switch 80. The switch 80 includes a plurality of radial detents 84, a location 86, and a dead-band 88. The switch 80 includes a force profile (see FIG. 9) in separate and equally-sized wedges. The force profile includes first 87 and second 89 cartesian forces. The first and second cartesian forces 87,89 are equal and opposite forces. The intersection of the first and second cartesian forces 87,89 form the dead-band 88.

In the force profile of the prior art switch shown in FIG. 9, as one approaches the location 86 disposed in the center of the switch 80 the force profiles proximate to the corners approaching the location 86 exert antagonistic forces on the user, thus, providing incoherent and confusing haptic feedback to the user.

Figure 10:
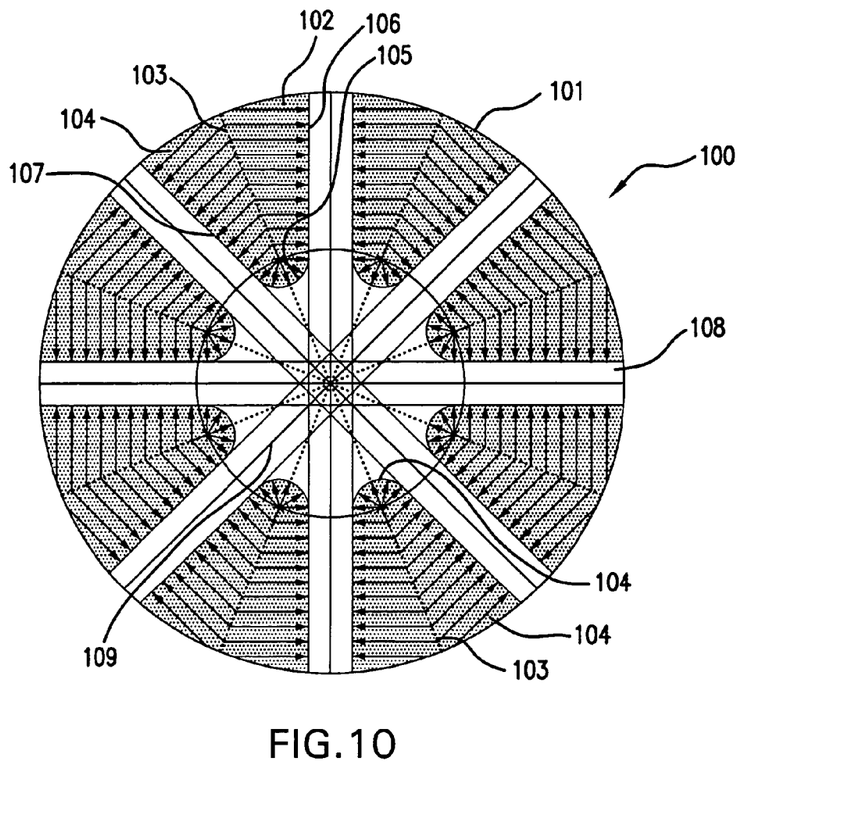
FIG. 10 is a schematic drawing of a switch according to an embodiment of the invention.

Referring now to FIG. 10, a switch 100 according to an embodiment of the invention is shown. The switch 100 comprises a wall 101 forming a perimeter around the switch 100. Preferably, the switch 100 comprises a plurality of cells 104 disposed adjacent to one another. In one embodiment, the switch 100 comprises a plurality of radial detents (not shown). The switch 100 comprises a location 109 and a plurality of dead-bands 108 disposed between the cells 104. In one embodiment, a spring (not shown) is disposed proximate to the location 109. In another embodiment, a centering spring is disposed on top of the switch 100.

Each cell 104 comprises a centerline 103, a corner 105, a first edge 106, and a second edge 107. As shown in FIG. 10, the corner 105 does not extend to the location 109. Further, the corner 105 does not form a sharp edge, but rather a gradual arc. The corner 105 joins first and second edges 106,107. The centerline 103 bisects the cell 104.

Each cell 104 also comprises a force profile (indicated by the vectors). The force profile of each cell 104 is directed outwardly from the centerline 103 toward the first and second edges 106,107 and the corner 105. Thus, the force profile of the switch guides a user toward the dead-bands 108 and the location 109.

Figure 11:
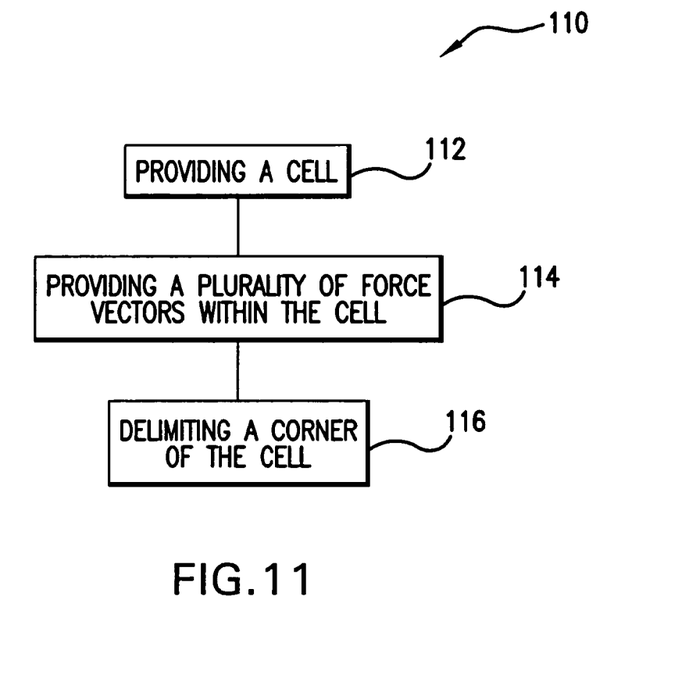
FIG. 11 is a block diagram of a method according to an embodiment of the invention.

Referring now to FIG. 11, a method 110 according to an embodiment of the invention is shown. FIG. 11 shows an embodiment of a method that may be used to make a switch, as described above. However, the method 110 may be used to form alternate switches. Items shown above in FIG. 10, as well as the accompanying description above, are referred to in describing FIG. 11 to aid understanding of the embodiment of the method 110 shown. Thus, the method 110 is not limited to the embodiments described above and with reference to FIG. 10.

As indicated by block 112, the method 110 comprises providing a cell comprising an arc and first and second edges. A plurality of cells form the switch. In one embodiment, the switch comprises a circular shape. In another embodiment, the switch comprises an eight-way switch. The eight-way switch is operable to select a channel about a first axis.

As indicated by block 114, the method 110 comprises providing a plurality of force vectors within the cell. The force vectors are directed radially toward the first and second edges. The force vectors direct a user toward the outside of the cell, i.e., toward a dead-band. As indicated by block 116, the method 110 comprises delimiting a corner of the cell. The corner is delimited by forming an arc joining the first and second edges. Thus, the force profile does not extend completely to a center of the switch. Preferably, the force vectors within the corner are directed toward the center of the switch.

In one embodiment, the method 110 comprises providing a biasing element proximate to the center of the switch. In another embodiment, the method 110 comprises providing a detent proximate to a radius of the switch. Other suitable configurations of switches can be used.

Figure 12:
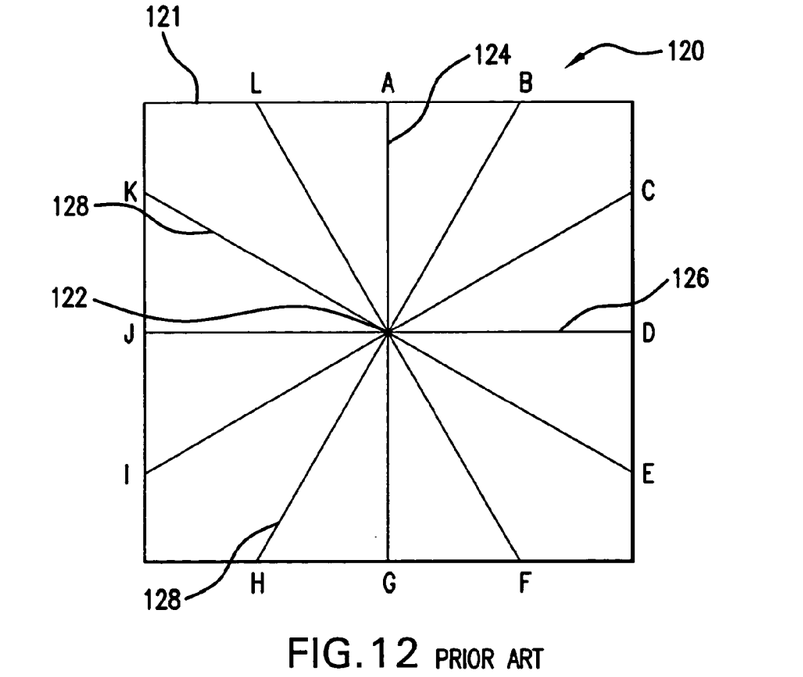
FIG. 12 is a schematic drawing of a prior art switch.

Referring now to FIG. 12, a prior art switch 120 is shown. The switch 120 includes a wall 121, a center 122, a first axis 124, a second axis 126, and a plurality of channels 128. The wall 121 forms a border about the switch 120. The first and second axes 124,126 are orthogonal to one another. The plurality of channels 128 intersect at the center 122 of the switch 120.

The switch 120 shows 12 different channels 128. Each channel is labeled with a letter beginning with the letter "A" and ending with the letter "L." Thus, a user can select up to 12 options (i.e., any letter from A-L) with the switch 120.

Such a switch is referred to as an N-way switch, where "N" refers to the number of channels that can be selected or activated. As the number of choices increases, the more difficult N-way switches become for one to navigate. It is generally easier to select the four cardinal directions than to select channels that are located at angles, especially when the angles are close together. Of course, reducing the size of the switch to accommodate smaller-sized devices adds to the difficulty in navigating the switch.

Figure 13:
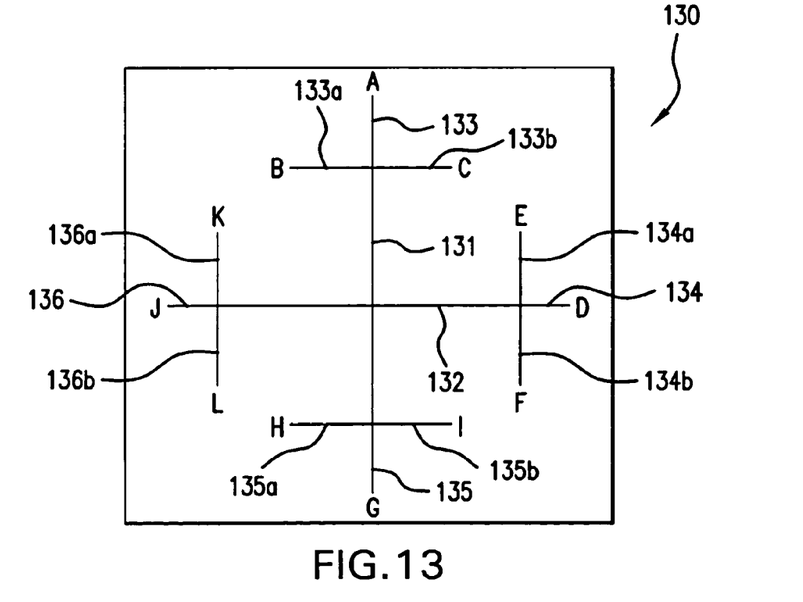
FIG. 13 is a schematic drawing of a switch according to an embodiment of the invention.
Figure 14:
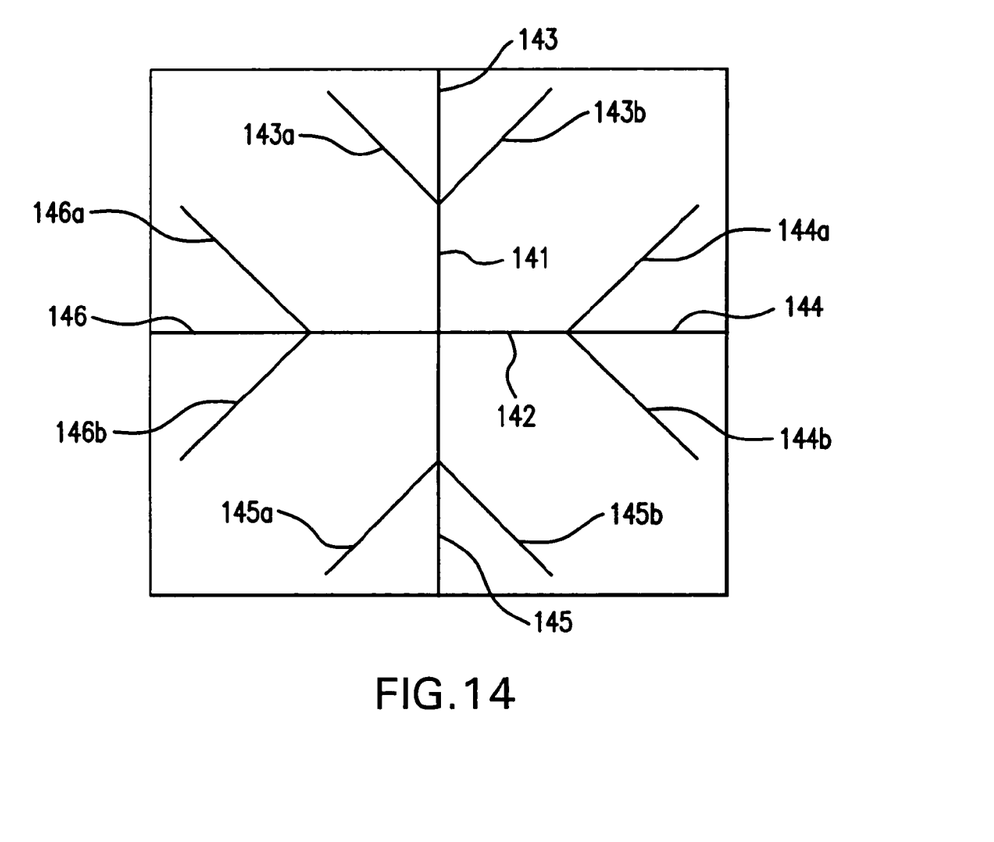
FIG. 14 is a schematic drawing of a switch according another embodiment of the invention.

Referring now to FIGS. 13 and 14, a switch 130 according to an embodiment of the invention is shown. The switch 130 can be referred to as an M×N switch to improve the navigability of a switch. The "M" dimension represents the number of available channels from a center of the workspace. Once one selects an initial or primary channel (generally along a cardinal direction), the "N" dimension offers additional channels to be explored and selected.

For example, each channel of the switch 130 is labeled with the letters "A" through "L." The letters A, D, G, and J are labeled along the "M" dimension, while the "N" dimensions are labeled with the letters B, C, E, F, H, I, K, and L. Thus, a 4×3 switch will offer the same number of options as a 12-way switch. However, the 4×3 switch only requires one to select along the cardinal directions making the task of selecting a channel easier for the user.

For example, to spell the word "ace" using the prior art switch of FIG. 12 would require one to select the channels representing the letters "c" and "e," which are disposed at predetermined angles off of a horizontal or vertical line, something which adds complexity to the task of navigating about the switch. Spelling the word "ace" using the switch of FIG. 13 only requires one to maneuver in a cardinal direction, something which is much simpler to do than in the prior art switch.

Referring again to FIG. 13, the switch 130 comprises a first primary channel 133 disposed about a first axis 131, a second primary channel 134 disposed about a second axis 132. In one embodiment, the first axis 131 is disposed substantially orthogonal to the second axis 132. Alternatively, the first and second axes 131, 132 can be disposed in other suitable arrangements.

The switch 130 also comprises a first secondary channel 133a, 133b disposed proximate to the first primary channel 133 and a second secondary channel 134a, 134b disposed proximate to the second primary channel 134. In one embodiment, the first secondary channel 133a, 133b is in communication with the first primary channel 133 and the second secondary channel 134a, 134b is in communication with the second primary channel 134.

In one embodiment, the first and second primary channels 133, 134 and the first and second secondary channels 133a, 133b, 134a, 134b are activated by one's touch, i.e., by a digit or device, such as a stylus. Alternatively, the first and second primary channels 133, 134 and the first and second secondary channels 133a, 133b, 134a, 134b are activated by depressing the switch 130 causing the switch to pivot about the first and/or second axes 131, 132.

In the embodiment shown in FIG. 13, the first secondary channel 133a, 133b is disposed substantially orthogonal to the first primary channel 133 and the second secondary channel 134a, 134b is disposed substantially orthogonal to the second primary channel 134. In the embodiment shown in FIG. 14, the first secondary channel 143a, 143b is disposed obliquely to the first primary channel 143 and the second secondary channel 144a, 144b is disposed obliquely to the second primary channel 144.

In one embodiment, the switch 130 further comprises a third primary channel 135 disposed substantially co-axial with the first primary channel 133 and a fourth primary channel 136 disposed substantially co-axial with the second primary channel 134. In another embodiment, the switch 130 further comprises a third secondary channel 135a, 135b disposed proximate to the third primary channel 135 and a fourth secondary channel 136a, 136b disposed proximate to the fourth primary channel 136. In one embodiment, the third secondary channel 135a, 135b is in communication with the third primary channel 135 and the fourth secondary channel 136a, 136b is in communication with the fourth primary channel 136.

In one embodiment, the third and fourth primary channels 135, 136 and the third and fourth secondary channels 135a, 135b, 136a, 136b are activated by one's touch. Alternatively, the third and fourth primary channels 135, 136 and the third and fourth secondary channels 135a, 135b, 136a, 136b are activated by depressing the switch 130 causing the switch 130 to pivot about the first and/or second axes 131, 132.

In the embodiment shown in FIG. 13, the third secondary channel 135a, 135b is disposed substantially orthogonal to the first primary channel 135 and the fourth secondary channel 136a, 136b is disposed substantially orthogonal to the second primary channel 136. In the embodiment shown in FIG. 14, the third secondary channel 145a, 145b is disposed obliquely to the third primary channel 145 and the second secondary channel 146a, 146b is disposed obliquely to the second primary channel 146.

Figure 15:
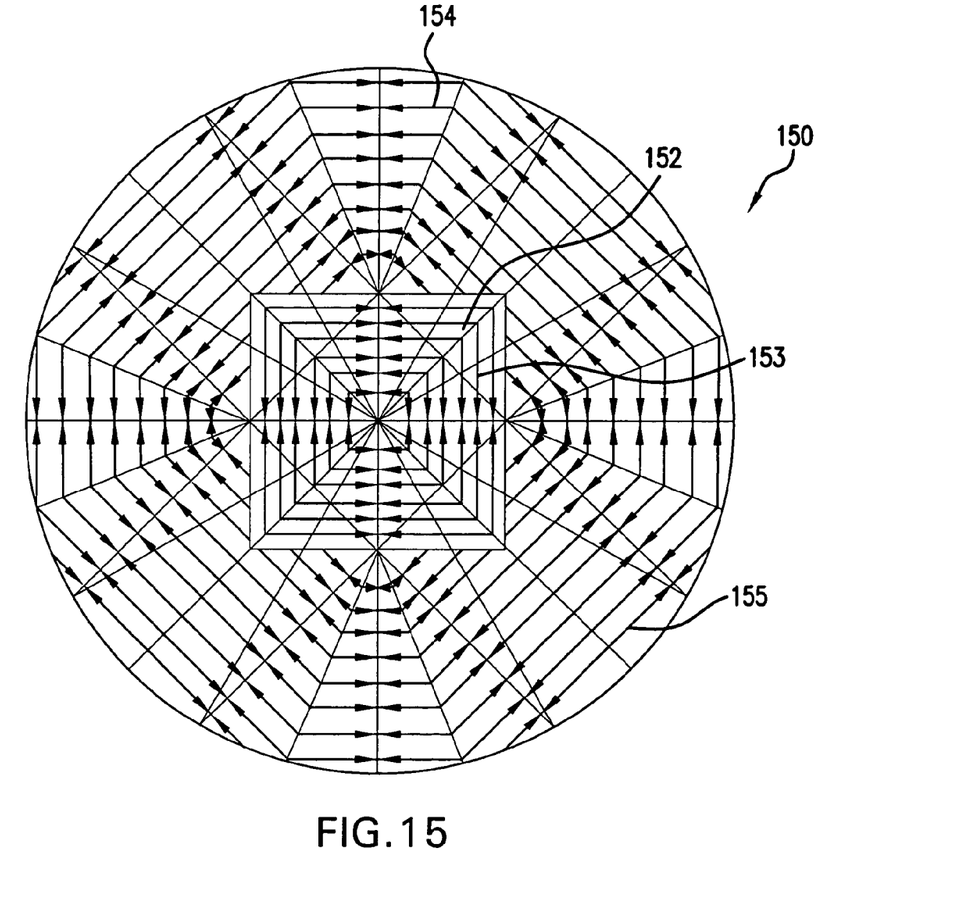
FIG. 15 is a schematic drawing of another switch according to another embodiment of the invention.

Referring now to FIG. 15, a switch 150 is shown. The switch 150 uses a 4-way switch 152 inside a circular switch 154 having 12 cells or channels. The 4-way switch 152 is similar to the embodiments described above and shows a force profile 153. The 4-way switch 152 allows one to access directly only four cells, after which one can select any of the 12 channels of the circular switch 154. The circular switch 154 shows a force profile 155, as previously described above. Thus, such an embodiment would be referred to as a 4×12 switch, and would provide one with a choice of 48 options. Other suitable variations of the arrangements and configurations of the embodiments described are possible.

While the present invention has been disclosed with reference to certain embodiments, numerous modifications, alterations, and changes to the described embodiments are possible without departing from the sphere and scope of the present invention, as defined by the appended claims. Accordingly, it is intended that the present invention not be limited to the described embodiments, but that it has the full scope defined by the language of the following claims, and equivalents thereof.

That which is claimed is:

1. A method comprising:
   defining a graphical user interface having a plurality of graphical input elements arranged in a matrix configuration;
   defining a first cell, the first cell comprising a first parameter representing a first haptic effect;
   assigning the first cell to a first graphical input element in the matrix configuration;
   assigning the first cell to a second graphical input element in the matrix configuration;
   receiving a sensor signal associated with a graphical user interface ("GUI") comprising the first and second graphical input elements, the sensor signal associated with a user input;
   determining a position within the GUI of the user input based at least in part on the sensor signal;
   determining an interaction between the position of the user input and at least one of the plurality of graphical input elements; and
   outputting the first haptic effect based at least in part on the first parameter and the interaction, the first haptic effect configured to resist or assist the user input.

2. The method of claim 1, further comprising displaying the GUI by a mobile phone or a personal digital assistant.

3. The method of claim 1, further comprising communicating the first cell from a first processor to a second processor.

4. The method of claim 3, further comprising:
   defining a second cell, the second cell comprising a second parameter representing a second haptic effect;
   communicating the second cell from the first processor to the second processor; and
   assigning the second cell to a third input element in the matrix configuration.

5. The method of claim 4, wherein the first and second cells are defined by the first processor and the first, second, and third input elements are assigned by the second processor.

6. The method of claim 4, wherein the third input element is disposed between the first and second input elements.

7. The method of claim 4, wherein the first cell comprises a first detent and the second cell comprises a second detent.

8. The method of claim 4, further comprising providing an actuator in communication with the first, second, and third input elements, the actuator operable to provide a computer-modulated force to the first, second, and third input elements.

9. The method of claim 3, wherein the second processor is disposed remotely from the first processor.

10. The method of claim 1, wherein the matrix configuration comprises a square shape.

11. The method of claim 1, wherein the matrix configuration comprises a circular shape.

12. The method of claim 1, wherein the first cell comprises an arc and first and second edges; and wherein the first haptic effect comprises a plurality of force vectors within the first cell, the force vectors directed outward from a centerline of the first cell toward the first and second edges.

13. A mobile device comprising:
a sensor;
an actuator configured to output a haptic effect; and
a processor in communication with the sensor and the actuator, the processor configured to:
define a graphical user interface having a plurality of graphical input elements arranged in a matrix configuration;
define a first cell, the first cell comprising a first parameter representing a first haptic effect;
assign the first cell to a first graphical input element in the matrix configuration;
assign the first cell to a second graphical input element in the matrix configuration;
receive a sensor signal from the sensor, the sensor signal associated with a graphical user interface ("GUI") comprising the first and second graphical input elements, the sensor signal associated with a user input;
determine a position within the GUI of the user input based at least in part on the sensor signal;
determine an interaction between the position of the user input and at least one of the plurality of graphical input elements; and
output the first haptic effect based at least in part on the first parameter and the interaction, the haptic effect configured to resist or assist the user input.

14. The mobile device of claim 13, wherein the mobile device comprises a mobile phone or a personal digital assistant.

15. The mobile device of claim 13, wherein the haptic effect is based on a plurality of detents defining:
a first primary channel defined along a first axis,
a second primary channel defined along a second axis,
a first secondary channel proximate to the first primary channel, and
a second secondary channel proximate to the second primary channel,
the plurality of detents configured to substantially constrain movement of the interaction to one of the first primary channel, the second primary channel, the first secondary channel, or the second secondary channel.

16. The mobile device of claim 15, wherein:
each channel is a substantially one-dimensional channel,
the first primary channel intersects the second primary channel,
the first secondary channel intersects one of the first or second primary channel, and
the second secondary channel intersects one of the first or second primary channels or the first secondary channel.

17. The mobile device of claim 16, further comprising:
a third primary channel defined substantially co-axial with the first primary channel;
a fourth primary channel defined substantially co-axial with the second primary channel;
a third secondary channel defined proximate to the third primary channel; and
a fourth secondary channel defined proximate to the fourth primary channel.

18. The mobile device of claim 17, wherein the third secondary channel is oblique to the third primary channel and the fourth secondary channel is oblique to the fourth primary channel.

19. The mobile device of claim 17, wherein the third secondary channel is substantially orthogonal to the third primary channel; and the fourth secondary channel is substantially orthogonal to the fourth primary channel.

20. The mobile device of claim 15, wherein the first axis is substantially orthogonal to the second axis.

21. The mobile device of claim 15, wherein the first secondary channel is oblique to the first primary channel and the second secondary channel is oblique to the second primary channel.

22. The mobile device of claim 15, wherein the first secondary channel is substantially orthogonal to the first primary channel; and the second secondary channel is substantially orthogonal to the second primary channel.

23. The mobile device of claim 15, wherein the GUI comprises a circular shape.

24. The mobile device of claim 15, wherein the GUI comprises an eight-way switch, the eight-way switch operable to select a channel about a first axis.

25. A non-transitory computer-readable medium comprising program code, the program code comprising:
program code for defining a graphical user interface having a plurality of graphical input elements arranged in a matrix configuration;
program code for defining a first cell, the first cell comprising a first parameter representing a first haptic effect;
program code for assigning the first cell to a first graphical input element in the matrix configuration;
program code for assigning the first cell to a second graphical input element in the matrix configuration;
program code for receiving a sensor signal from a sensor associated with a graphical user interface ("GUI") comprising the first and second graphical input elements, the sensor configured to detect a user input and the sensor signal associated with the user input;
program code for determining a position of the user input based at least in part on the sensor signal;
program code for determining an interaction between the position of the user input and at least one of the plurality of graphical input elements; and
program code for outputting the first haptic effect based at least in part on the first parameter and the interaction, the first haptic effect configured to resist or assist the user input.

26. The non-transitory computer-readable medium of claim 25, further comprising program code for communicating the first cell from a first processor to a second processor.

27. The non-transitory computer-readable medium of claim 26, further comprising:
program code for defining a second cell, the second cell comprising a second parameter representing a second haptic effect;
program code for communicating the second cell from the first processor to the second processor; and program code for assigning the second cell to a third input
element in the matrix configuration.

* * * * *